United States Patent Office 3,787,539
Patented Jan. 22, 1974

3,787,539
THIONOTHIOLPHOSPHORIC ACID O,S-DIESTER AMIDES
Reimer Colln, Wuppertal-Elberfeld, Ingeborg Hammann, Cologne, Gunter Unterstenhafer, Opladen, and Wolfgang Behrenz, Cologne-Stammheim, Germany, assignors to Bayer Aktiengesellschaft, Leverkusen, Germany
No Drawing. Original application Aug. 1, 1969, Ser. No. 846,939, now abandoned. Divided and this application Dec. 8, 1971, Ser. No. 206,179
Int. Cl. A01n 9/36; C07f 9/16, 9/24
U.S. Cl. 260—959
8 Claims

ABSTRACT OF THE DISCLOSURE

Reacting gaseous ammonia, thionothiolphosphoric acid S-ester dichloride and a hydroxy compound;
I.e. gaseous ammonia, thionothiolphosphoric acid-S-(alkyl, alkenyl, haloalkyl, alkoxy-alkyl, alkylmercapto-akyl, cycloalkyl, phenylalkyl, phenyl and halophenyl)-ester dichloride, especially thionothiolphosphoric acid-S-(alkyl, phenylalkyl, phenyl and chlorophenyl)-ester dichloride, and an alkanol, alkenol, haloalkanol, alkoxyalkanol, alkylmercapto-alkanol, cycloalkanol, phenylalkanol, phenol or halophenol, especially an alkanol, alkenol, chloroalkanol, alkoxy-alkanol, alkylmercapto-alkanol, cycloalkanol, phenol or chlorophenol;
By introducing gaseous ammonia until saturation into a mixture of such S-ester dichloride and hydroxy compound, at a temperature of about −10 to +20° C., optionally in the presence of an inert organic solvent or diluent;
To form the corresponding thionothiolphosphoric acid O,S-di(alkyl, alkenyl, haloalkyl, alkoxy-alkyl, alkylmercapto-alkyl, cycloalkyl phenylakyl phenyl and/or halophenyl) ester amides some of which are new compounds and all of which possess insecticidal acaricidal and bird and rodent-repellent properties.

This is a division of application Ser. No. 846,939, filed Aug. 1, 1969, now abandoned.

The present invention relates to and has for its objects the provision for particular new methods of reacting gaseous ammonia, thionothiolphosphoric acid S-ester dichloride and a hydroxy compound;
I.e. gaseous ammonia, thionothiolphosphoric acid-S-(alkyl, alkenyl, haloalkyl, alkoxy-alkyl, alkylmercapto-alkyl, cycloalkyl, phenylalkyl, phenyl and halophenyl)-ester dichloride, especially thionothiolphosphoric acid-S-(alkyl, phenylalkyl, phenyl and chlorophenyl)-ester dichloride, and an alkanol, alkenol, haloalkanol, alkoxyalkanol, alkylmercapto-alkanol, cycloalkanol, phenylalkanol, phenol or halophenol, especially an alkanol, alkenol, chloroalkanol, alkoxy-alkanol, alkylmercapto-alkanol, cycloalkanol, phenol or chlorophenol;
by introducing gaseous ammonia until saturation into a mixture of such S-ester dichloride and hydroxy compound, at a temperature of about −10 to +20° C., optionally in the presence of an inert organic solvent or diluent;
to form the corresponding thionothiolphosphoric acid O,S-di(alkyl, alkenyl, haloalkyl, alkoxy-alkyl, alkylmercapto-alkyl, cycloalkyl, phenylalkyl, phenyl and/or halophenyl) ester amides, some of which are new compounds and all of which possess insecticidal, acaricidal and bird and rodent repellent properties, i.e. in a simple overall single step reaction, using readily available starting materials whereby to attain outstanding yields and high purity, with other and further objects of the invention becoming apparent from a study of the within specification and accompanying examples.

It is already known that thionothiolphosphoric acid O,S-diester amides substituted on the nitrogen atom are obtained when the appropriate thionophosphoric acid O-ester amide halides are reacted with metal mercaptides according to the particulars given in U.S. Pats. 3,072,702 and 3,062,705. This process, however, is not suitable for the preparation of N-unsubstituted thionothiolphosphoric acid O,S-diester amides, since the thionophosphoric acid O-ester amide halides required for this purpose are hitherto unknown and obviously because of their instability are also not accessible.

Furthermore, it is known from U.S. Pat. 3,165,545 that thionothiolphosphoric acid O,S-diester amides are obtained when the chlorine atoms in thiophosphoryl chloride are exchanged step-wise and successively in any desired sequence for alkoxy, arylmercapto and amido radicals in the presence of acid-binding agents. However, this process, too, would hardly be suitable for the industrial production of N-unsubstituted thionothiolphosphoric acid O,S-diester amides. In addition, such process possesses the disadvantages of high consumption of acid-binding agents and low purity of the end products, especially as the intermediates also are not purified.

Finally, in Soviet Russian Pat. 185,345, it is disclosed that thionothiolphosphoric acid O,S-diester amides can be prepared when an alcohol or a phenol and an amine are caused to act, step-wise and successively in the presence of a tertiary amine as an acid-binding agent, on a thionothiolphosphoric acid S-ester dichloride. In this process, too, the relatively high consumption of teritary amine used as acid-binding agent is disadvantageous.

Corresponding thiolphosphoric acid O,S-diester amides, such as thiolphosphoric acid O,S-dimethyl amide (A) and thiolphosphoric acid O-ethyl-S-methyl amide (B), are known to possess some degree of insecticidal and/or acaricidal activity, but such compounds are markedly toxic to warm-blooded animals.

It has now been found, in accordance with the present invention, that a versatile and smooth process may now be provided for the production in favorable yields and high purity of thionothiolphosphoric acid O,S-diester amides, some of which are new compounds and all of which possess insecticidal, acaricidal and bird and rodent properties, of the formula

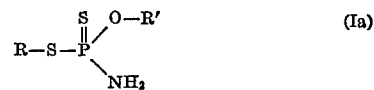
(Ia)

in which

R and R' each individually is alkyl of 1–12 carbon atoms, alkenyl of 2–6 carbon atoms, haloalkyl of 1–6 carbon atoms, alkoxy-alkyl having 1–4 carbon atoms in the alkoxy moiety and 1–4 carbon atoms in the alkyl moiety, alkylmercapto-alkyl having 1–4 carbon atoms in the alkylmercapto moiety and 1–4 carbon atoms in the alkyl moiety, cycloalkyl of 5–6 ring carbon atoms, phenyl-alkyl having 1–2 carbon atoms in the alkyl moiety, phenyl or halophenyl, which comprises introducing gaseous ammonia until saturation, at a temperature of from substantially between about −10 to +20° C., into a mixture of a thionothiolphosphoric acid S-ester dichloride of the formula

(II)

in which

R is the same as defined above, and a hydroxyl compound of the formula $$HO-R' \qquad (III)$$

in which

R' is the same as defined above,
to form the corresponding thionothiolphosphoric acid O,S-diester amide.

It is decidedly surprising that with this method of procedure the compounds of Formula Ia above are obtained in high purity and high yield; for, by reason of the prior art, at best it would have been expected that the simultaneous action of ammonia and a hydroxyl group-containing compound on a phosphoric acid dichloride would lead to a mixture of the corresponding diamide, ester amide and diester. A preferential formation of diamide rather than of ester amide would more readily have been foreseen since, as is known, ammonia is much more reactive toward acid chlorides than are hydroxyl groups. Therefore, to one skilled in the art it was not at all to be expected that the ester amide would be formed as sole main product of the reaction.

The process according to the instant reaction exhibits a series of advantages, its simple execution being worthy of particular mention. Moreover, it is advantageous that the introduction of two different functional groups is successful in connection with the carrying out of one single reaction step. Thus, the industrial production of the end products is substantially facilitated. It is further advantageous that the process according to the present invention yields reaction products of outstanding purity and at the same time in high yield. Furthermore, no tertiary amines are required as acid-binding agents but merely gaseous ammonia.

Advantageously, in accordance with the present invention, in the various formulae herein:

R and R' each individually represents
straight and branched chain alkyl hydrocarbon of 1–12 carbon atoms such as methyl, ethyl, n- and iso-propyl, n-, iso-, sec.- and tert.-butyl, n-, iso-, sec.- and tert.-amyl, n- and iso-hexyl, 2-methyl-pentyl, 1,2,2-trimethyl-propyl, 2,2-dimethyl-butyl, 2-ethyl-butyl, pinacolyl, n-heptyl, 3-ethyl-pentyl, 2,3-dimethyl-pentyl, n-octyl, 2-ethyl-hexyl, 2-ethyl-3-methyl-pentyl, n-nonyl, n-decyl, n-undecyl, n-dodecyl, and the like, especially $C_{1-10}$ or $C_{1-8}$ or $C_{1-6}$ or $C_{1-4}$ or $C_{1-3}$ or $C_{1-2}$ alkyl, including lower alkyl, and more especially $C_{1-6}$ or $C_{1-4}$ or $C_{1-2}$ alkyl;

straight and branched chain alkenyl hydrocarbon of 2–6 carbon atoms such as vinyl, α-, β- and γ-allyl (i.e. prop-2-enyl, 1-methyl-vinyl and prop-1-enyl), but-1,2 and 3-enyl, 1-methyl-prop-1 and 2-enyl, 2-methyl-prop-1 and 2-enyl, pentenyl, hexenyl, and the like, especially $C_{2-4}$ or $C_{2-3}$ or $C_{3-4}$ or $C_3$ alkenyl, including lower alkenyl, and more especially allyl, e.g. α-allyl or prop-2-enyl;

haloalkyl of 1–6 carbon atoms such as mono, di and tri (same and mixed) chloro, bromo, iodo and/or fluoro, preferably chloro, -substituted methyl to hexyl inclusive as defined above, and the like, including chloromethyl, 2-chloro-ethyl, 2,2,2-trichloro-ethyl, 1,3-dichloro-propyl, 1-chloromethyl-2-chloro-ethyl, and the like, especially mono to tri chloro- $C_{1-4}$ or $C_{1-3}$ or $C_{1-2}$ alkyl, including chlorolower alkyl having 1–3 chloro substituents;

alkoxy-alkyl having 1–4 carbon atoms in the alkoxy moiety and 1–4 carbon atoms in the alkyl moiety such as methoxy, ethoxy, n- and iso-propoxy, n-, iso-, sec.- and tert.-butoxy, and the like, -substituted methyl to tert.-butyl inclusive as defined above, and the like, including methoxy-methyl, 2-methoxy-ethyl, 2-ethoxy-ethyl, ethoxy-methyl, 2-n-butoxy-ethyl, and the like, especially $C_{1-3}$ or $C_{1-2}$ alkoxy-$C_{1-3}$ or $C_{1-2}$ alkyl, including lower alkoxy-lower alkyl, and more especially β-ethoxy-ethyl;

alkylmercapto-alkyl having 1–4 carbon atoms in the alkylmercapto moiety and 1–4 carbon atoms in the alkyl moiety such as methylmercapto, ethylmercapto, n- and iso-propylmercapto, n-, iso-, sec.- and tert.-alkylmercapto, and the like, -substituted methyl to tert.-butyl inclusive as defined above, and the like, including 2-ethylmercapto-ethyl, 2-methylmercapto-ethyl, ethylmercapto-methyl, and the like, especially $C_{1-3}$ or $C_{1-2}$ alkylmercapto-$C_{1-3}$ or $C_{1-2}$ alkyl, including lower alkylmercapto-lower alkyl, and more especially β-ethylmercapto-ethyl;

cycloalkyl hydrocarbon having 5–6 ring carbon atoms such as cyclopentyl, cyclohexyl, and the like, especially cyclohexyl;

phenyl substituted alkyl having 1–2 carbon atoms in the alkyl radical such as benzyl, phenyl-eth-1 and 2-yl, and the like, especially benzyl;

phenyl; or halophenyl such as 2-, 3- and 4-chloro, bromo, iodo and fluoro, preferably chloro, -substituted phenyl, especially 4-chloro-phenyl.

Preferably, R is $C_{1-6}$ or $C_{1-4}$ alkyl; or phenyl-$C_{1-2}$ alkyl; or phenyl; or chlorophenyl; and R' is $C_{1-6}$ or $C_{1-4}$ alkyl; or $C_{3-4}$ alkenyl; or chloro-$C_{1-4}$ alkyl having 1–3 chloro substituents; or $C_{1-4}$ or $C_{1-2}$ alkoxy-$C_{1-4}$ or $C_{1-2}$ alkyl; or $C_{1-4}$ or $C_{1-2}$ alkylmercapto-$C_{1-4}$ or $C_{1-2}$ alkyl; or $C_{5-6}$ cycloalkyl; or phenyl; or chlorophenyl.

In particular, R is $C_{1-3}$ or $C_{1-2}$ alkyl; or benzyl; or phenyl; or chlorophenyl; and R' is $C_{1-6}$ or $C_{1-4}$ alkyl; or $C_3$ alkenyl; or chloro-$C_{1-4}$ alkyl having 1–3 chloro substituents; or $C_{1-2}$ alkoxy-$C_{1-2}$ alkyl; or $C_{1-2}$ alkylmercapto-$C_{1-2}$ alkyl; or cyclohexyl; or phenyl; or chlorophenyl.

If for instance thionothiolphosphoric acid S-methyl ester dichloride and methanol are used as starting materials, the reaction course can be represented by the following overall formula scheme:

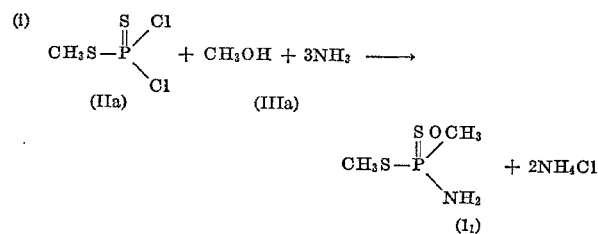

It can be assumed that the total reaction course (i) proceeds via two successive reaction steps (iA) and (iB), for example:

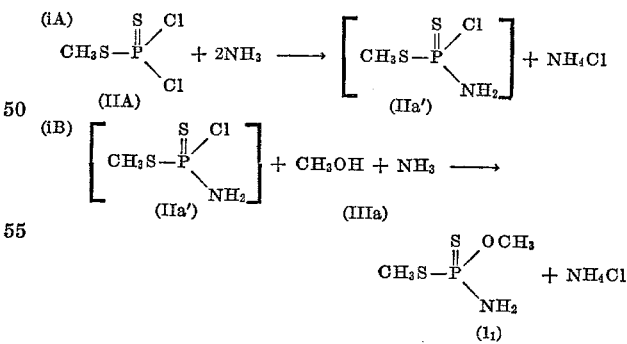

The intermediate product which is unstable because of its high reactivity has, immediately after its formation, the opportunity to react with the hydroxyl compound which is present in the reaction mixture and which—owing to the specific method of conducting the reaction (i.e. at low temperature and with cumulative introduction of gaseous ammonia)—is always in excess with respect to the ammonia.

The high reactivity of the intermediate product is of fundamental importance in this manner of carrying out the process in question. To emphasize the chemical peculiarity of the production process according to the present invention, it may be mentioned that the conventional use of primary and secondary amines, instead of ammonia, does not lead to nearly such good yields of the corresponding N-substituted ester amides. In these cases there is lack of sufficient reactivity of the appropriate intermediate products toward hydroxyl compounds; as a result of this, there is a preferential formation of diamides. As is known, N-substituted amide chlorides are also stable and capable of being isolated, which shows their relatively low reactivity.

The thionothiolphosphoric acid S-ester dichlorides and hydroxyl compounds which are to be reacted according to the present invention are clearly defined by Formulae II and III above.

Examples of thionothiolphosphoric acid S-ester dichlorides of Formula II above which may be reacted according to the present invention include: thionothiolphosphoric acid S-methyl, -ethyl, -n-propyl, isopropyl, -n-butyl, -sec. - butyl, -(2-chloro-ethyl), cyclohexyl, -benzyl, -phenyl, -monochloro-, -dichloro- and -trichloro-phenyl, and the like, ester dichlorides.

As examples of hydroxyl compounds of Formula III above which may be reacted according to the present invention, there are mentioned: methyl, ethyl, n-propyl, isopropyl, n-butyl, isobutyl, sec.-butyl, tert.-butyl, n-amyl, isoamyl, sec.-amyl, tert.-amyl, n-hexyl, isohexyl, 2-methyl-pentyl, 1,2,2-trimethyl-propyl, 2,2-dimethyl-butyl, pinacolyl, n-heptyl, 3-ethyl-pentyl, 2,3-dimethyl-pentyl, n-octyl, n-decyl, n-dodecyl, 2-ethyl-hexyl, 2-ethyl-3-methyl-pentyl, allyl, methoxy-methyl, 2-methoxy-ethyl, 2-ethoxy-ethyl, ethoxy-methyl, 2-n-butoxy-ethyl, chloromethyl, 2-chloro-ethyl, 2,2,2-trichloro-ethyl, 1,3-dichloro-propyl, 2-ethylmercapto-ethyl, 2-methylmercapto-ethyl, ethylmercapto-methyl, cyclopentyl, cyclohexyl, methyl-cyclohexyl, dimethyl-cyclohexyl, trimethyl-cyclohexyl, benzyl, ethyl-benzyl, dichloro-benzyl, and the like, alcohols.

Also suitable are phenol and 2-, 3- and 4-chloro-, 2-, 3- and 4-bromo, 2,4-, 3,4- and 2,5-dichloro-, 2,4,5- and 2,4,6-trichloro-, 2-, 3- and 4-methyl-, 2-chloro-4-methyl-, 3-chloro-4-methyl-, 3-methyl-4-chloro, 4-tert.-butyl-, 2-chloro-4-tert.-butyl-, 2-, 3- and 4-nitro-, 2- and 3-chloro-4-nitro-, 2,5- and 3,5-dichloro-4-nitro-, 3-methyl-4-nitro-, 3-nitro-4-methyl-, 4-methoxy-, 2- and 3-methoxy-4-nitro-, 3-nitro-4-chloro-, 3-nitro-4,6-dichloro-, 2-nitro-4-chloro-, 4-methylmercapto-, 4-methyl - sulfoxyl-, 4-methyl-sulfonyl-, 3-methyl-4-methylmercapto-, 3,5 - dimethyl-4-methylmercapto-, 3-methyl-4-methyl-sulfoxyl-, 3-methyl-4-methyl-sulfonyl-, and the like, phenols.

The thionothiolphosphoric acid S-ester dichlorides of Formula II above required as starting materials for the process according to the present invention are known from the literature (for example, Houben-Weyl, "Methoden der organischen Chemie," Volume XII/2, page 682 and the Soviet Russian Pats. 175,962, 180,596 and 185,912) and are readily accessible, even on an industrial scale.

All of the hydroxy compounds of Formula III above, of course, are well known and readily accessible, as the artisan will appreciate.

The process according to the present invention is preferably carried out in the presence of suitable, i.e. inert, solvents (which term includes mere diluents), and/or mixtures thereof. As such, practically all inert organic solvents are suitable. These include (optionally chlorinated) aromatic and aliphatic hydrocarbons, especially $C_{6-10}$ aryl and lower, e.g. $C_{1-6}$, aliphatic hydrocarbons, including lower, e.g., $C_{1-6}$, alkyl hydrocarbons, and the corresponding chlorinated hydrocarbons such as benzene, benzine, toluene, xylene, chlorobenzene, dichloromethane, di-, tri- and tetra-chloroethane, chloroform, carbon tetrachloride, and the like; ethers, i.e. aliphatic and cyclo-aliphatic ethers, especially lower, e.g. $C_{1-6}$, dialkyl and cycloalkyl ethers, for example diethyl and di-n-butyl ether, dioxan, tetrahydrofuran, and the like; low-boiling ketones and nitriles, i.e. low boiling aliphatic ketones and nitriles, especially lower, e.g. $C_{1-6}$, dialkyl ketones and lower, e.g. $C_{2-6}$, alkanoic nitriles, for example acetone, methylethyl, methylisopropyl and methylisobutyl ketone, and the like, aceto- and propio-nitrile, and the like, as well as mixtures of these solvents. Carboxylic acid esters, i.e. carboxylic acid aliphatic, e.g. lower aliphatic, esters, especially lower, e.g. $C_{2-6}$, alkanoic acid lower, e.g. $C_{1-6}$, alkyl esters, such as ethyl acetate may also be employed, i.e. alone or in admixture with the foregoing solvents or with mixtures of the foregoing solvents.

The reaction temperatures can be varied within a fairly wide range. In general, the reaction is carried out at from substantially between about —10 to +20° C., and preferably at from between about —5 to +10° C.

When carrying out the process according to the present invention, depending upon the nature of the alcohol, i.e. aliphatic or cycloaliphatic alcohol, or phenol to be reacted, there is generally added substantially between about a 0.1-molar to 5-molar excess thereof to the starting thionothiolphosphoric acid S-ester dichloride, normally dissolved in one of the above-mentioned solvents (i.e. molar ratio of hydroxy compound to S-ester dichloride of about 1.1–6:1), and gaseous ammonia is introduced into this mixture until saturation, with stirring and external cooling. The end of the reaction is marked by the subsidence of the evolution of heat and emergence of ammonia from the open end of the apparatus (a 3-necked flask with stirrer and gas inlet tube is used). The reaction products are obtained by removal of the formed ammonium chloride by means of filtration, washing and drying of the filtrate and evaporating off the solvent. The formed diester amides are obtained in most cases as colorless liquids or oils but, in part, in crystalline form also. The end products of low molecular weight can be distilled under reduced pressure.

The N-unsubstituted thionothiolphosphoric acid O,S-di-ester amides which can be prepared according to the process of the present invention for the first time by means of a smoothly proceeding reaction belong to a class of compounds which hitherto, according to known methods, was not accessible or was accessible only with difficulty, which can be seen in particular from the fact that even the simplest representatives (in Formula Ia above, where R and R'=lower alkyl) have not hitherto been described in the literature.

Surprisingly, the compounds of Formula Ia above, compared with the active compounds of analogous constitution and the same type of activity hitherto known from the literature, are distinguished by a substantially better effectiveness, with considerably lower toxicity to warm-blooded animals. The compounds produced according to the present invention therefore represent a genuine enrichment of the art.

In this regard, in accordance with one specific embodiment, the present invention provides particular new thionothiolphosphoric acid O,S-diester amides of the formula

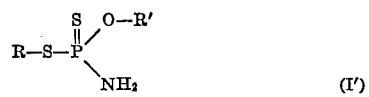

(I')

in which

R is alkyl of 1–6 or 1–4 or 1–2 carbon atoms, phenylalkyl having 1–2 carbon atoms in the alkyl moiety, e.g. benzyl, and R' is alkyl of 1–12 or 1–6 or 1–3 carbon atoms, alkenyl of 2–6 or 3–4 carbon atoms, especially allyl, haloalkyl of 1–6 or 1–4 carbon atoms, e.g. chloroalkyl of 1–3 chloro substituents and 1–4 or 1–3 carbon atoms, alkoxy-alkyl of 1–4 or 1–3 or 1–2 carbon atoms in the alkoxy moiety and 1–4 or 1–3 or 1–2 carbon atoms in the alkyl moiety, cycloalkyl of 5–6 ring carbon atoms, especially cyclohexyl.

Advantageously, the compounds of Formula Ia above are distinguished by outstanding insecticidal and acaricidal effectiveness; yet they also have a bird-repellent and rodent-repellent effect. Moreover, such compounds possess only a low toxicity to warm-blooded animals and a concomitantly low phytotoxicity. The pesticidal effects sets in rapidly and is long-lasting. The compounds produced according to the present invention are therefore usable with success in crop protection endeavors and in the protection of stored products as well as in the hygiene field for the control of noxious sucking and eating insects and of mites.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (*coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*), such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like.

Also to be classed with the biting insects contemplated herein are beetles (*Coleoptera*), for example the granary weevil (*Sitophilus granarius - calandra granaria*), the Colorado beetle (*Leptino-tarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (Calandar or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Caliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When used against household pests and pests of stored products, particularly flies and mosquitoes, the compounds produced according to the present invention are also distinguished by an outstanding residual activity on wood and clay as well as by a good stability to alkali on limed substrates.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other acaricides, insecticides and fungicides, or nematicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplates those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects, and acarids which comprise applying to at least one of correspondingly (a) such insects, (b) such acarids, and (c) the corresponding habitat thereof, i.e. the locus to be protected, a correspondingly combative or toxic amount, i.e. a arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, fumigating., scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The insecticidal, and acaricidal activity of the instant active compounds is illustrated, without limitation, by the following examples.

EXAMPLE 1

Plutella test

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 1:

TABLE 1.—PLUTELLA TEST

| Active compound (constitution) | Concentration of active compound in percent | Degree of destruction in percent after 3 days |
|---|---|---|
| $(1_2)$   $CH_3-O\underset{NH_2}{\overset{S}{\underset{\diagdown}{\overset{\diagup}{P}}}}-SCH_3$ | 0.1<br>0.01 | 100<br>100 |
| $(2_1)$   $\underset{CH_3}{\overset{CH_3}{\mid}}CH-CH_2-O\underset{NH_2}{\overset{S}{\underset{\diagdown}{\overset{\diagup}{P}}}}-SCH_3$ | 0.1<br>0.01 | 100<br>100 |
| $(3_1)$   $n-C_6H_{13}-O\underset{NH_2}{\overset{S}{\underset{\diagdown}{\overset{\diagup}{P}}}}-SCH_3$ | 0.1<br>0.01 | 100<br>95 |
| $(4_1)$   $CH_2=CH-CH_2-O\underset{NH_2}{\overset{S}{\underset{\diagdown}{\overset{\diagup}{P}}}}-SCH_3$ | 0.1<br>0.01<br>0.001 | 100<br>100<br>100 |
| $(5_1)$   $C_2H_5O-CH_2-CH_2-O\underset{NH_2}{\overset{S}{\underset{\diagdown}{\overset{\diagup}{P}}}}-SCH_3$ | 1.0<br>0.01 | 100<br>100 |

TABLE 1—Continued

| Active compound (constitution) | Concentration of active compound in percent | Degree of destruction in percent after 3 days |
|---|---|---|
| (6₁) phenyl-O-P(=S)(NH₂)-SCH₃ | 0.1<br>0.01<br>0.001 | 100<br>100<br>100 |
| (7₁) C₂H₅O-P(=S)(NH₂)-SC₂H₅ | 0.1<br>0.01 | 100<br>95 |
| (8₁) CH₃O-P(=S)(NH₂)-S-C₆H₄-Cl | 0.1<br>0.01 | 100<br>95 |

EXAMPLE 2

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100% means that all the aphids are killed, whereas 0% means that none of the aphids are killed.

The particular active compounds tested, their concentrations, the evaluation time and the results obtained can be seen from the following Table 2:

TABLE 2.—MYZUS TEST

| Active compound (constitution) | Concentration of active compound in percent | Degree of destruction in percent after 24 hours |
|---|---|---|
| (9₁) n-C₅H₁₁O-P(=S)(NH₂)-SCH₃ | 0.1<br>0.01 | 100<br>100 |
| (10₁) (CH₃)₂CH-CH₂-CH₂-O-P(=S)(NH₂)-SCH₃ | 0.1<br>0.01<br>0.001 | 100<br>95<br>80 |
| (11₁) CH₃-CH₂-CH(CH₂CH₃)-CH₂-O-P(=S)(NH₂)-SCH₃ | 0.1<br>0.01<br>0.001 | 100<br>95<br>60 |
| (12a₁) C₂H₅S-CH₂-CH₂-S-P(=O)(NH₂)-SCH₃ | 0.1 | 100 |
| (13₁) C₂H₅S-CH₂-CH₂-O-P(=S)(NH₂)-SCH₃ }* | 0.01 | 100 |
| (14₁) CH₃-O-P(=S)(NH₂)-S-C₆H₅ | 0.1<br>0.01 | 100<br>100 |
| (15₁) (CH₃)₂CH-O-P(=S)(NH₂)-S-C₆H₄-Cl | 0.1<br>0.01 | 100<br>90 |

*Mixture 2:1.

EXAMPLE 3

Rhopalosiphum test (systemic action)

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Oat plants (*Avena sativa*) which have been strongly infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After the specified period of time, the degree of destruction is determined as a percentage: 100% means that all the aphids are killed, whereas 0% means that none of the aphids are killed.

The particular active compounds tested, their concentrations, the evaluation time and the results obtained can be seen from the following Table 3:

TABLE 3.—RHOPALOSIPHUM TEST
(systemic action)

| Active compound (constitution) | Concentration of active compound in percent | Degree of destruction in percent after 4 days |
|---|---|---|
| (16$_1$) 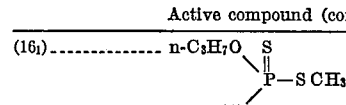 | 0.1<br>0.01<br>0.001 | 100<br>100<br>100 |
| (17$_1$) 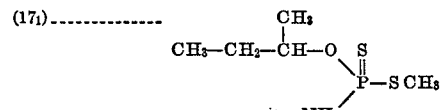 | 0.1<br>0.01<br>0.001 | 100<br>100<br>90 |
| (18$_1$) 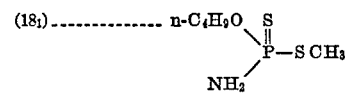 | 0.1<br>0.01 | 100<br>100 |
| (19$_1$) 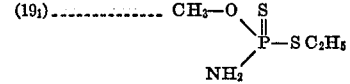 | 0.1<br>0.01 | 100<br>99 |

Example 4

Doralis test (systemic action)

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concenration.

Bean plants (*Vicia faba*) which have been heavily infested with the bean aphid (*Doralis fabae*) are watered with the preparation of the given active compound so that such preparation of the active compound penetrates into the soil without wetting the leaves of the bean plants. The active compound is taken up by the bean plants from the soil and so reaches the infested leaves.

After the specified period of time, the degree of destruction is determined as a percentage. 100% means that all the aphids are killed, whereas 0% means that none of the aphids are killed.

The particular active compounds tested, their concentrations, the evaluation time and the results obtained can be seen from the following Table 4:

TABLE 4.—DORALIS TEST
(Systemic action)

| Active compound (constitution) | Concentration of active compound in percent | Degree of destruction in percent after 4 days |
|---|---|---|
| (20$_1$) 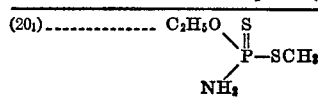 | 0.1<br>0.01<br>0.001 | 100<br>100<br>90 |
| (21$_1$) 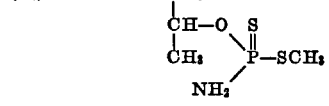 | 0.1<br>0.01<br>0.001 | 100<br>100<br>98 |
| (22$_1$) 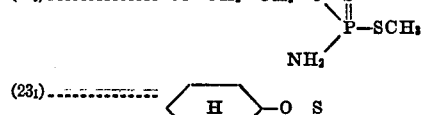 | 0.1<br>0.01<br>0.001 | 100<br>100<br>90 |
| (23$_1$)  | 0.1<br>0.01<br>0.001 | 100<br>100<br>100 |

EXAMPLE 5

LD$_{100}$ test

Test insects: *Sitophilus granarius* (granery weevil)
Solvent: Acetone.

2 parts by weight of the particular active compound are dissolved in 1000 parts by volume of the stated solvent. The solution so obtained is diluted with further solvent to the desired concentrations.

2.5 ml. of the solution of the given active compound are pipetted into a Petri dish. On the bottom of the Petri dish there is situated a filter paper with a diameter of about 9.5 cm. The Petri dish remains uncovered until the solvent has completely evaporated. The amount of active compound per square metre of filter paper varies with the concentration of the solution of active compound used. About 25 test insects are then placed in the Petri dish and it is covered with a glass lid.

The condition of the test insects is observed after both 1 and 3 days from the commencement of the experiments. The knock down effect is determined as a percentage.

The particular active compounds tested, their concentrations, the test insects and the results obtained can be seen from the following Table 5:

TABLE 5.—LD$_{100}$ TEST
(*Sitophilus granarius*)

| | Active compound (constitution) | Concentration of active compound in percent | Degree of destruction in percent |
|---|---|---|---|
| (A) | $CH_3S-\overset{O}{\underset{NH_2}{P}}-OCH_3$ (known) | 0.2<br>0.02 | 90<br>0 |
| (B) | $CH_3S-\overset{O}{\underset{NH_2}{P}}-OC_2H_5$ (known) | 0.2 | 0 |
| (20$_2$) | $CH_3S-\overset{S}{\underset{NH_2}{P}}-OC_2H_5$ | 0.2<br>0.02 | 100<br>70 |
| (4$_2$) | $CH_3S-\overset{S}{\underset{NH_2}{P}}-OCH_2CH=CH_2$ | 0.2<br>0.02 | 100<br>90 |
| (18$_2$) | $CH_3S-\overset{S}{\underset{NH_2}{P}}-OC_4H_9\text{-n}$ | 0.2<br>0.02 | 100<br>100 |
| (9$_2$) | $CH_3S-\overset{S}{\underset{NH_2}{P}}-OC_5H_{11}\text{-n}$ | 0.2<br>0.02 | 100<br>100 |
| (3$_2$) | $CH_3S-\overset{S}{\underset{NH_2}{P}}-OC_6H_{13}\text{-n}$ | 0.2<br>0.02 | 100<br>95 |
| (24$_1$) | $CH_3-S-\overset{S}{\underset{NH_2}{P}}-O-CH_2-\underset{CH_3}{\overset{CH_3}{C}}-CH_2-CH_3$ | 0.2<br>0.02 | 100<br>100 |
| (10$_2$) | $CH_3S-\overset{S}{\underset{NH_2}{P}}-OCH_2-CH_2-CH(CH_3)_2$ | 0.2<br>0.02 | 100<br>100 |
| (2$_2$) | $CH_3S-\overset{S}{\underset{NH_2}{P}}-OCH_2-CH(CH_3)_2$ | 0.2<br>0.02 | 100<br>100 |
| (22$_2$) | $CH_3S-\overset{S}{\underset{NH_2}{P}}-O-CH_2-CH_2-Cl$ | 0.2<br>0.02 | 100<br>100 |
| (23$_2$) | $CH_3S-\overset{S}{\underset{NH_2}{P}}-O-C_6H_5$ | 0.2<br>0.02 | 100<br>100 |

TABLE 5—Continued

| Active compound (constitution) | Concentration of active compound in percent | Degree of destruction in percent |
|---|---|---|
| ($25_1$) $C_2H_5S-\underset{\underset{NH_2}{\|}}{\overset{\overset{S}{\|}}{P}}-O-\text{C}_6H_5$ | 0.2<br>0.02 | 100<br>100 |
| ($14_2$) $\text{C}_6H_5-S-\underset{\underset{NH_2}{\|}}{\overset{\overset{S}{\|}}{P}}-OCH_3$ | 0.2<br>0.02 | 100<br>100 |
| ($26_1$) $\text{C}_6H_5-CH_2S-\underset{\underset{NH_2}{\|}}{\overset{\overset{S}{\|}}{P}}-OCH_3$ | 0.2<br>0.02 | 100<br>80 |
| ($8_2$) $Cl-\text{C}_6H_4-S-\underset{\underset{NH_2}{\|}}{\overset{\overset{S}{\|}}{P}}-OCH_3$ | 0.2<br>0.02<br>0.002 | 100<br>100<br>30 |
| ($15_2$) $Cl-\text{C}_6H_4-S-\underset{\underset{NH_2}{\|}}{\overset{\overset{S}{\|}}{P}}-OCH(CH_3)_2$ | 0.2<br>0.02 | 100<br>100 |

EXAMPLE 6

$LD_{100}$ test

Test insects: *Blatta orientalis*
Solvent: Acetone 2 parts by weight of the particular active compound are dissolved in 1000 parts by volume of the stated solvent, and the resulting solution is diluted with further solvent to the desired final concentrations.

2.5 ml. of the solution of the given active compound are pipetted into a Petri dish. On the bottom of the Petri dish there is situated a filter paper with a diameter of about 9.5 cm. The Petri dish remains uncovered until the solvent has completely evaporated. The amount of active compound per square meter of filter paper varies with the concentration of the solution of active compound used. 10 test insects are then placed in the Petri dish and it is covered with a glass lid.

The condition of the test insects is observed after both 1 and 3 days from the commencement of the experiments. The knock down effect is determined as a percentage.

The particular active compounds tested, their concentrations, the test insects and the results obtained can be seen from the following Table 6:

TABLE 6.—$LD_{100}$ TEST
(*Blatta orientalis*)

| Active compound (constitution) | Concentration of active compound in percent | Degree of destruction in percent |
|---|---|---|
| A $CH_3S-\underset{\underset{NH_2}{\|}}{\overset{\overset{O}{\|}}{P}}-OCH_3$ (known) | 0.2<br>0.02 | 100<br>0 |
| (B) $CH_3S-\underset{\underset{NH_2}{\|}}{\overset{\overset{O}{\|}}{P}}-OC_2H_5$ (known) | 0.2 | 0 |
| ($1_2$) $CH_3S-\underset{\underset{NH_2}{\|}}{\overset{\overset{S}{\|}}{P}}-OCH_3$ | 0.2<br>0.02 | 100<br>60 |
| ($4_2$) $CH_3S-\underset{\underset{NH_2}{\|}}{\overset{\overset{S}{\|}}{P}}-OCH_2CH=CH_2$ | 0.2<br>0.02 | 100<br>100 |
| ($16_2$) $CH_3S-\underset{\underset{NH_2}{\|}}{\overset{\overset{S}{\|}}{P}}-O-C_3H_7\text{-n}$ | 0.2<br>0.02 | 100<br>100 |
| ($18_2$) $CH_3S-\underset{\underset{NH_2}{\|}}{\overset{\overset{S}{\|}}{P}}-OC_4H_9\text{-n}$ | 0.2<br>0.02<br>0.002 | 100<br>100<br>30 |

TABLE 6—Continued

| Active compound (constitution) | Concentration of active compound in percent | Degree of destruction in percent |
|---|---|---|
| (9₂) $CH_3S-P(=S)(OC_5H_{11}\text{-}n)(NH_2)$ | 0.2<br>0.02 | 100<br>100 |
| (19₂) $C_2H_5S-P(=S)(OCH_3)(NH_2)$ | 0.2<br>0.02 | 100<br>100 |
| (7₂) $C_2H_5S-P(=S)(OC_2H_5)(NH_2)$ | 0.2<br>0.02<br>0.002 | 100<br>100<br>30 |
| (14₂) $C_6H_5-S-P(=S)(OCH_3)(NH_2)$ | 0.2<br>0.02<br>0.002 | 100<br>60<br>30 |
| (21₂) $CH_3S-P(=S)(O-CH(CH_3)_2)(NH_2)$ | 0.2<br>0.02 | 100<br>100 |
| (2₂) $CH_3S-P(=S)(OCH_2-CH(CH_3)_2)(NH_2)$ | 0.2<br>0.02<br>0.002 | 100<br>100<br>60 |
| (17₂) $CH_3S-P(=S)(O-CH(CH_3)-CH_2-CH_3)(NH_2)$ | 0.2<br>0.02 | 100<br>100 |
| (10₂) $CH_3S-P(=S)(O-CH_2-CH_2-CH(CH_3)_2)(NH_2)$ | 0.2<br>0.02 | 100<br>100 |
| (24₂) $CH_3S-P(=S)(O-CH_2-C(CH_3)(CH_2-CH_3))(NH_2)$ | 0.2<br>0.02 | 100<br>100 |
| (11₂) $CH_3S-P(=S)(OCH_2-CH(CH_2-CH_3)-CH_2-CH_3)(NH_2)$ | 0.2<br>0.02 | 100<br>60 |

EXAMPLE 7

LT₁₀₀ test for Diptera

Test insects: *Musca domestica*

Solvent: Acetone 2 parts by weight of the particular active compound are dissolved in 1000 parts by volume of the stated solvent, and the resulting solution is diluted with further solvent to the final desired lower concentration.

2.5 ml. of the solution of the given active compound are pipetted into a Petri dish. On the bottom of the Petri dish there is located a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% knock down effect is determined.

The particular active compounds tested, their concentrations, the test insects and the period of time at which there is a 100% known down effect can be seen from the following Table 7:

TABLE 7.—$LT_{100}$ TEST FOR DIPTERA
(*Musca domestica*)

| | Active compound (constitution) | Concentration of active compound in percent | $LT_{100}$ |
|---|---|---|---|
| (A) | $CH_3S-P(=O)(OCH_3)(NH_2)$ (known) | 0.2<br>0.02 | 150 min.<br>4 hrs. |
| (B) | $CH_3S-P(=O)(OC_2H_5)(NH_2)$ (known) | 0.2<br>0.02 | 200 min.<br>4 hrs. |
| (1₄) | $CH_3S-P(=S)(OCH_3)(NH_2)$ | 0.2<br>0.02<br>0.002 | 110 min.<br>165 min.<br>4 hrs. |
| (20₄) | $CH_3S-P(=S)(OC_2H_5)(NH_2)$ | 0.2<br>0.02<br>0.002 | 95 min.<br>155 min.<br>210 min. |
| (22₄) | $CH_3S-P(=S)(OCH_2-CH_2-Cl)(NH_2)$ | 0.2<br>0.02<br>0.002 | 90 min.<br>240 min.<br>4 hrs. |
| (19₃) | $C_2H_5S-P(=S)(OCH_3)(NH_2)$ | 0.2<br>0.02<br>0.002 | 110 min.<br>140 min.<br>>4 hrs. |
| (21₃) | $CH_3-S-P(=S)(OCH(CH_3)_2)(NH_2)$ | 0.2<br>0.02<br>0.002 | 160 min.<br>260 min.<br>>4 hrs. |
| (16₃) | $CH_3S-P(=S)(O-C_3H_7n)(NH_2)$ | 0.2<br>0.02<br>0.002 | 90 min.<br>90 min.<br>210 min. |
| (18₄) | $CH_3S-P(=S)(OC_4H_9n)(NH_2)$ | 0.2<br>0.02<br>0.002 | 65 min.<br>110 min.<br>4 hrs.=90% |
| (2₄) | $CH_3S-P(=S)(OCH_2-CH(CH_3)_2)(NH_2)$ | 0.2<br>0.02<br>0.002 | 70 min.<br>110 min.<br>>4 hrs. |
| (9₄) | $CH_3S-P(=S)(OC_5H_{11}n)(NH_2)$ | 0.2<br>0.02<br>0.002 | 100 min.<br>210 min.<br>>4 hrs. |
| (17₄) | $CH_3S-P(=S)(O-CH(CH_3)-CH_2-CH_3)(NH_2)$ | 0.2<br>0.02<br>0.002 | 110 min.<br>210 min.<br>>4 hrs. |
| (27₁) | $C_2H_5S-P(=S)(O-CH(CH_3)_2)(NH_2)$ | 0.2<br>0.02<br>0.002 | 100 min.<br>190 min.<br>>4 hrs. |
| (11₃) | $CH_3-S-P(=S)(OCH_2-CH(CH_2-CH_3)-CH_2-CH_3)(NH_2)$ | 0.2<br>0.02<br>0.002 | 80 min.<br>155 min.<br>>4 hrs. |

TABLE 7.—Continued

| Active compound (constitution) | Concentration of active compound in percent | $LT_{100}$ |
|---|---|---|
| (10₄) $CH_3S-\underset{\underset{NH_2}{\|}}{\overset{\overset{S}{\|}}{P}}-O-CH_2-CH_2-\underset{\underset{CH_3}{\|}}{\overset{CH_3}{\|}}{CH}$ | 0.2<br>0.02<br>0.002 | 50 min.<br>140 min.<br>>4 hrs. |
| (4₄) $CH_3S-\underset{\underset{NH_2}{\|}}{\overset{\overset{S}{\|}}{P}}-OCH_2CH=CH_2$ | 0.2<br>0.02<br>0.002 | 50 min.<br>140 min.<br>>4 hrs. |
| (7₄) $C_2H_5S-\underset{\underset{NH_2}{\|}}{\overset{\overset{S}{\|}}{P}}-OC_2H_5$ | 0.2<br>0.02<br>0.002 | 85 min.<br>140 min.<br>210 min. |

EXAMPLE 8

As already mentioned, the compounds produced according to the present invention possess a substantially lower toxicity to warm-blooded animals than known compounds of analogous constitution. This clear superiority can be seen from the following Table 8:

TABLE 8.—TOXICITY TO WARM-BLOODED ANIMALS

| | Active compound (constitution) | $LD_{50}$ rat per os, mg./kg. |
|---|---|---|
| (A) | $CH_3O-\underset{\underset{NH_2}{\|}}{\overset{\overset{O}{\|}}{P}}-SCH_3$ (known) | 25 |
| (B) | $C_2H_5O-\underset{\underset{NH_2}{\|}}{\overset{\overset{O}{\|}}{P}}-SCH_3$ (known) | 5–10 |
| (1₄) | $CH_3O-\underset{\underset{NH_2}{\|}}{\overset{\overset{S}{\|}}{P}}-SCH_3$ | 250–500 |
| (20₄) | $C_2H_5O-\underset{\underset{NH_2}{\|}}{\overset{\overset{S}{\|}}{P}}-SCH_3$ | 500 |
| (21₄) | $(CH_3)_2CH-O-\underset{\underset{NH_2}{\|}}{\overset{\overset{S}{\|}}{P}}-SCH_3$ | 500–1,000 |
| (17₄) | $CH_3-CH_2-CH(CH_3)-O-\underset{\underset{NH_2}{\|}}{\overset{\overset{S}{\|}}{P}}-SCH_3$ | 50–100 |
| (2₄) | $(CH_3)_2CH-CH_2-O-\underset{\underset{NH_2}{\|}}{\overset{\overset{S}{\|}}{P}}-SCH_3$ | 50–100 |
| (18₄) | $n-C_4H_9O-\underset{\underset{NH_2}{\|}}{\overset{\overset{S}{\|}}{P}}-SCH_3$ | 50–100 |
| (9₄) | $n-C_5H_{11}O-\underset{\underset{NH_2}{\|}}{\overset{\overset{S}{\|}}{P}}-SCH_3$ | 50–100 |
| (3₄) | $n-C_6H_{13}O-\underset{\underset{NH_2}{\|}}{\overset{\overset{S}{\|}}{P}}-SCH_3$ | 50–100 |
| (24₄) | $CH_3-CH_2-C(CH_3)_2-CH_2-O-\underset{\underset{NH_2}{\|}}{\overset{\overset{S}{\|}}{P}}-SCH_3$ | 100–250 |
| (4₄) | $CH_2=CH-CH_2-O-\underset{\underset{NH_2}{\|}}{\overset{\overset{S}{\|}}{P}}-SCH_3$ | 250 |
| (5₄) | $C_2H_5O-CH_2-CH_2-O-\underset{\underset{NH_2}{\|}}{\overset{\overset{S}{\|}}{P}}-SCH_3$ | 100–250 |
| (22₄) | $Cl-CH_2-CH_2-O-\underset{\underset{NH_2}{\|}}{\overset{\overset{S}{\|}}{P}}-SCH_3$ | 100 |
| (28₄) | $(Cl-CH_2)_2CH-O-\underset{\underset{NH_2}{\|}}{\overset{\overset{S}{\|}}{P}}-SCH_3$ | 250–500 |
| (29₄) | $Cl_3-C-CH_2-O-\underset{\underset{NH_2}{\|}}{\overset{\overset{S}{\|}}{P}}-SCH_3$ | 500 |
| (23₄) | $C_6H_{11}-O-\underset{\underset{NH_2}{\|}}{\overset{\overset{S}{\|}}{P}}-SCH_3$ | 500 |
| (6₄) | $C_6H_5-O-\underset{\underset{NH_2}{\|}}{\overset{\overset{S}{\|}}{P}}-SCH_3$ | 250 |
| (30₄) | $Cl-C_6H_4-O-\underset{\underset{NH_2}{\|}}{\overset{\overset{S}{\|}}{P}}-SCH_3$ | 500–1,000 |
| (19₄) | $CH_3O-\underset{\underset{NH_2}{\|}}{\overset{\overset{S}{\|}}{P}}-SC_2H_5$ | 100–250 |

TABLE 8—Continued

| Active compound (constitution) | $LD_{50}$, rat per os, mg./kg. |
|---|---|
| (7₄) .......... $C_2H_5O\text{\textbackslash}P(=S)-SC_2H_5$ / $NH_2$ | 500–1,000 |
| (27₂) .......... $(CH_3)_2CH-O\text{\textbackslash}P(=S)-SC_2H_5$ / $NH_2$ | 500–1,000 |
| (25₂) .......... Phenyl-$O\text{\textbackslash}P(=S)-SC_2H_5$ / $NH_2$ (with H on ring) | >1,000 |
| (31₁) .......... Phenyl-$O\text{\textbackslash}P(=S)-SC_2H_5$ / $NH_2$ | 1,000 |
| (14₄) .......... $CH_3O\text{\textbackslash}P(=S)-S-\text{phenyl}$ / $NH_2$ | 250–500 |
| (26₂) .......... $CH_3O\text{\textbackslash}P(=S)-S-CH_2-\text{phenyl}$ / $NH_2$ | 50–100 |
| (32₁) .......... $(CH_3)_2CH-O\text{\textbackslash}P(=S)-S-CH_2-\text{phenyl}$ / $NH_2$ | 100–250 |
| (8₃) .......... $CH_3-O\text{\textbackslash}P(=S)-S-\text{phenyl}-Cl$ / $NH_2$ | 500 |
| (15₃) .......... $(CH_3)_2CH-O\text{\textbackslash}P(=S)-S-\text{phenyl}-Cl$ / $NH_2$ | 50–100 |

The following further examples illustrate, without limitation, the process for producing the instant active compounds according to the present invention:

EXAMPLE 9

(1₆)
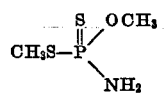

Into a solution of 181 g. (1 mol) thionothiolphosphoric acid S-methyl ester dichloride and 36 g. (1.12 mols) of methanol in 400 ml. toluene there is introduced gaseous ammonia at a reaction mixture temperature of −5 to 0° C., with stirring and external cooling, until saturation, which takes about one hour. The separated ammonium chloride is filtered off and the filtrate is washed three times with, in each case, 150 ml. of water. After drying over sodium sulfate, the solvent is removed under reduced pressure. In this way there are obtained 112.5 g. of a colorless liquid with the refractive index $n_D^{21}=1.5820$, corresponding to a yield of 71.5% of the theory. The formed thionothiolphosphoric acid O,S-dimethyl ester amide can be distilled without decomposition and has a boiling point of 86° C./0.2 mm. Hg.

Analysis.—Calculated for a molecular weight of 157.19 (percent): P, 19.71; S, 40.79; N, 8.90. Found (percent): P, 19.60; S, 40.46; N, 8.79.

EXAMPLE 10

(20₅)
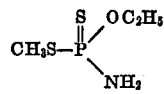

Gaseous ammonia is introduced, under the conditions stated in Example 9, into a mixture of 90.5 g. (0.5 mol) thionothiolphosphoric acid S-methyl ester dichloride, 92 g. (2 mol) ethanol and 200 cc. toluene, and the reaction mixture is worked up as described in Example 9. 67.2 g. (78.5% of theory) of thionothiolphosphoric acid O-ethyl-S-methyl diester amide are obtained in the form of a colorless liquid with the refractive index $n_D^{22}=1.5670$ and a boiling point of 77° C./0.01 mm. Hg.

Analysis.—Calculated for a molecular weight of 171.22 (percent): P, 18.09; S, 37.45; N, 8.18. Found (percent): P, 17.82; S, 37.14; N, 8.09.

In the same way as described in the preceding Examples 9 and 10, the corresponding thionothiolphosphoric O,S-diester amide compounds in the following list are obtained, only the methods of working up having to be adapted to the particular conditions in each case, in order to remove, after reaction, the excess which is present of the hydroxyl compound used. Thus, for example, when phenols are used as starting materials, the excess is removed by washing with the calculated amount of a dilute solution of alkali. In the case of water-insoluble higher alcohols, however, the excess can be separated by distillation.

| Constitution | Physical properties |
|---|---|
| (21₁) ........ $CH_3S-P(=S)(OCH(CH_3)_2)-NH_2$ | $n_D^{23}=1.5500$; B.P. 73° C./0.0 mm. Hg; M.P. 33° C. (from ether-petroleum ether). |
| (28₂) ........ $CH_3S-P(=S)(OCH(CH_2Cl)_2)-NH_2$ | $n_D^{22}=1.5784$; colorless oil. |
| (16₄) ........ $CH_3S-P(=S)(OCH_2CH_2CH_3)-NH_2$ | $n_D^{24}=1.5528$; B.P. 86° C./0.05 mm. Hg. |
| (22₄) ........ $CH_3S-P(=S)(OCH_2CH_2Cl)-NH_2$ | $n_D^{24}=1.5878$; colorless oil. |

TABLE—Continued

| | Constitution | Physical properties |
|---|---|---|
| (29₂) | S=P(SCH₃)(OCH₂CCl₃)(NH₂) | $n_D^{21}$=1.5838; colorless oil. |
| (23₄) | S=P(SCH₃)(O-C₆H₁₁)(NH₂) | $n_D^{21}$=1.5596; B.P. 130° C./0.1 mm. Hg. |
| (18₄) | S=P(SCH₃)(OC₄H₉-n)(NH₂) | $n_D^{24}$=1.5427; B.P. 102° C./0.2 mm. Hg. |
| (3₄) | S=P(SCH₃)(OC₅H₁₁-n)(NH₂) | $n_D^{24}$=1.5266; colorless oil. |
| (2₄) | S=P(SCH₃)(OCH₂CH(CH₃)₂)(NH₂) | $n_D^{24}$=1.5395; colorless liquid. |
| (9₄) | S=P(SCH₃)(OC₈H₁₇-n)(NH₂) | $n_D^{22}$=1.5332; colorless oil. |
| (17₄) | S=P(SCH₃)(OCH(C₂H₅)(CH₃))(NH₂) | $n_D^{22}$=1.5434; colorless oil. |
| (24₄) | S=P(SCH₃)(OCH₂C(CH₃)(C₂H₅)(CH₃))(NH₂) | $n_D^{28}$=1.5310; colorless oil. |
| (5₄) | S=P(SCH₃)(OCH₂CH₂OCH₂CH₃)(NH₂) | $n_D^{22}$=1.5476; colorless oil. |
| (11₄) | S=P(SCH₃)(OCH₂CH(C₂H₅)₂)(NH₂) | $n_D^{23}$=1.5299; colorless oil. |
| (13₂) [12a₂] | S=P(SCH₃)(OCH₂CH₂SC₂H₅)(NH₂) | The product in part rearranges under the working-up conditions (heat) into the thiol form (i.e. compound 12a); $n_D^{24}$ of the mixture=1.5925. |
| (10₄) | S=P(SCH₃)(OCH₂CH₂CH(CH₃)₂)(NH₂) | $n_D^{22}$=1.5339; colorless liquid. |
| (4₄) | S=P(SCH₃)(OCH₂CH=CH₂)(NH₂) | $n_D^{16}$=1.5727; colorless liquid. |
| (6₁) | S=P(SCH₃)(O-C₆H₅)(NH₂) | $n_D^{24}$=1.6234; colorless oil. |
| (30₂) | S=P(SCH₃)(O-C₆H₄-Cl)(NH₂) | $n_D^{21}$=1.6152; colorless oil. |
| (19₄) | S=P(SC₂H₅)(OCH₃)(NH₂) | $n_D^{24}$=1.5691; B.P. 78° C./0.1 mm. Hg. |

TABLE—Continued

| | Constitution | Physical properties |
|---|---|---|
| (27₁) | C₂H₅S−P(=S)(OCH(CH₃)₂)(NH₂) | $n_D^{22}=1.5398$; B.P. 112° C./2 mm. Hg. |
| (7₅) | C₂H₅S−P(=S)(OC₂H₅)(NH₂) | $n_D^{24}=1.5530$; B.P. 78° C./0.01 mm. Hg. |
| (25₁) | C₂H₅S−P(=S)(O-cyclohexenyl-H)(NH₂) | $n_D^{20}=1.5627$; colorless oil. |
| (31₁) | C₂H₅S−P(=S)(O-phenyl)(NH₂) | $n_D^{29}=1.6120$; colorless oil. |
| (8₄) | Cl−C₆H₄−S−P(=S)(OCH₃)(NH₂) | M.P. 95° C. to 96° C. |
| (15₄) | Cl−C₆H₄−S−P(=S)(OCH(CH₃)₂)(NH₂) | M.P. 43° C. from petroleum ether. |
| (14₄) | C₆H₅−S−P(=S)(OCH₃)(NH₂) | $n_D^{21}=1.6215$; colorless oil. |
| (26₁) | C₆H₅−CH₂−S−P(=S)(OCH₃)(NH₂) | $n_D^{18}=1.6217$; colorless oil. |
| (32₁) | C₆H₅−CH₂−S−P(=S)(OCH(CH₃)₂)(NH₂) | $n_D^{10}=1.5978$; colorless oil. |

It will be realized by the artisan that all of the foregoing compounds contemplated by the present invention, i.e. produced by the instant process, possess the desired strong and selective pesticidal, e.g. arthropodicidal, i.e. insecticidal or acaricidal, properties for combating insects, and acarids as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of insects, and acarids by application of such compounds to such insects, acarids, and/or their habitat.

It will be appreciated that the instant specification and examples are set forth by way of illustration and not limitation, and that various modifications and changes may be made without departing from the spirit and scope of the present invention.

What is claimed is:

1. Thionothiolphosphoric acid O,S - diester amide of the formula

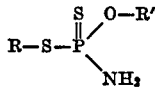

in which

R is selected from the group consisting of alkyl of 1-6 carbon atoms, phenyl-alkyl having 1-2 carbon atoms in the alkyl moiety, and R' is selected from the group consisting of alkyl of 1-12 carbon atoms, alkenyl of 2-6 carbon atoms, chloro- or bromo-alkyl of 1-6 carbon atoms having 1-3 chloro or bromo substituents, alkoxyalkyl having 1-4 carbon atoms in the alkoxy moiety and 1-4 carbon atoms in the alkyl moiety, and cycloalkyl of 5-6 ring carbon atoms.

2. Compound according to claim 1 wherein R is selected from the group consisting of $C_{1-4}$ alkyl, phenyl-$C_{1-2}$ alkyl, and R' is selected from the group consisting of $C_{1-6}$ alkyl, $C_{3-4}$ alkenyl, chloro-$C_{1-4}$ alkyl having 1-3 chloro substituents, $C_{1-3}$ alkoxy-$C_{1-3}$ alkyl, and $C_{5-6}$ cycloalkyl.

3. Compound according to claim 1 wherein R is selected from the group consisting of $C_{1-2}$ alkyl, benzyl, and R' is selected from the group consisting of $C_{1-3}$ alkyl, allyl, chloro-$C_{1-3}$ alkyl having 1-3 chloro substituents, $C_{1-2}$ alkoxy-$C_{1-2}$ alkyl, and cyclohexyl.

4. Compound according to claim 1 wherein such compound is thionothiolphosphoric acid O-methyl-S-methyl diester amide of the formula

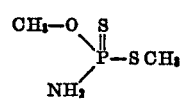

5. Compound according to claim 1 wherein such compound is thionothiolphosphoric acid O-ethyl-S-methyl diester amide of the formula

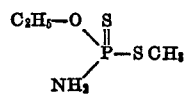

6. Compound according to claim 1 wherein such compound is thionothiolphosphoric acid O-methyl-S-ethyl-diester amide of the formula

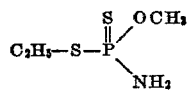

7. Compound according to claim 1 wherein such compound is thionothiolphosphoric acid O-isopropyl-S-methyl diester amide of the formula

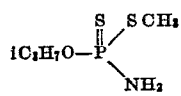

8. Compound according to claim 1 wherein such compound is thionothiolphosphoric acid O-isopropyl-S-ethyl diester amide of the formula

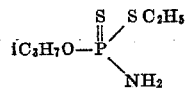

References Cited
UNITED STATES PATENTS 3,639,547  1/1972  Magee _____ 260—959 X
3,072,702  1/1963  Senkbeil _____ 260—959 X LEWIS GOTTS, Primary Examiner R. L. RAYMOND, Assistant Examiner U.S. Cl. X.R.

260—948, 950, 956, 957, 958, 973, 984; 424—216, 217, 219, 220